J. CURTIN.
CLAMP.
APPLICATION FILED SEPT. 27, 1915.

1,200,817.

Patented Oct. 10, 1916.

WITNESSES:
Alan Franklin.
P. S. Pidwell

INVENTOR.
Joseph Curtin
BY John H. Miller.
ATTORNEY.

UNITED STATES PATENT OFFICE.

JOSEPH CURTIN, OF BERKELEY, CALIFORNIA.

CLAMP.

1,200,817.  Specification of Letters Patent.  Patented Oct. 10, 1916.

Application filed September 27, 1915. Serial No. 52,842.

*To all whom it may concern:*

Be it known that I, JOSEPH CURTIN, a subject of the King of England, having declared my intention of becoming a citizen of the United States, and a resident of Berkeley, in the county of Alameda and State of California, have made a new and useful Invention—to wit, Clamp—and I do hereby declare the following to be a full, clear, concise, and exact description thereof.

The invention contemplates an improved clamp, particularly adapted to clamp a hose around a nipple.

Figure 1:
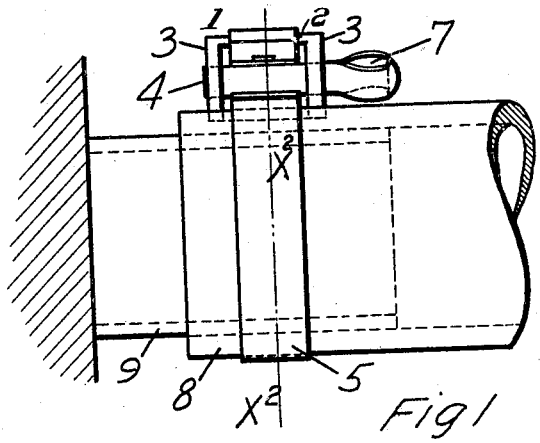
Figure 2:
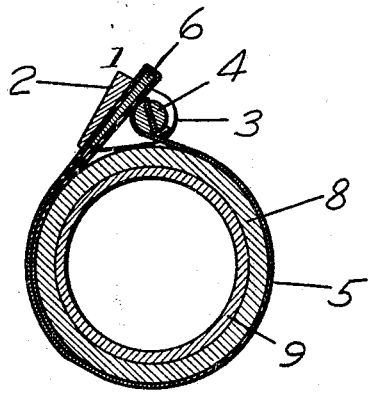

Referring to the accompanying drawing: Figure 1 is a side view of the clamp illustrating the clamp clamping a band around a hose and clamping the hose to a nipple. Fig. 2 is a sectional view taken on line $x^2$—$x^2$ of Fig. 1.

In the drawing 1 indicates a coupling element consisting of side member 2 and end eye members 3 through which eye members extends a pin 4. One end of a band 5 is bent over and secured to a wedge 6 and is adapted to be wedged by said wedge between the side wall 2 of the coupling element and the pin 4 whereby said end of the band is coupled to the coupling element. The pin 4 is split to receive the other end of the band 5 and one end of the pin may have an eye 7 to receive a tool for turning the pin. The band may be placed around the end of a hose 8 fitting over a nipple 9 so that upon turning the pin 4, by a tool extended through the eye 7, and winding one end of the band around the pin, the band is contracted around the hose and the other end of the band is drawn and wedged securely between the coupling element, member 2 and the pin 4, until the hose is clamped firmly on the nipple by the clamp. The friction of the wedged end of the band with the pin 4 when the band is drawn tight around the hose prevents turning of the pin and unwinding of the band and thereby locks the clamp in clamping position. The clamp may be applied to other purposes if desirable as it is not confined to its use as a hose clamp.

I claim:

1. A clamp comprising a coupling element, a pin mounted in said element, a band, a wedge at one end of said band adapted to fit between said coupling element and said pin, means for connecting the other end of said band to said pin, said pin being adapted to be turned to wind one end of said band around it to contract the band and wedge the other end of the band with said wedge between said coupling element and said pin so as to couple the wedge end of the band to said coupling element and to hold said pin against turning and unwinding the other end of the band.

2. A clamp comprising a coupling element, a pin mounted in said element, a band, a wedge at one end of said band adapted to fit between said coupling element and said pin, said pin being split to receive the other end of said band, said band being adapted to be turned to wind one end of said band around it to contract the band and wedge the other end thereof with said wedge between said coupling element and said pin so as to couple the wedge end of the band to said coupling element and to hold the pin against turning and unwinding the other end of the band.

3. A clamp comprising a coupling element, a pin mounted in said element, a band, a wedge at one end of said band adapted to fit between said coupling element and said pin, means for connecting the other end of said band to said pin, an eye on said pin adapted to receive a tool for turning said pin and winding one end of said band around it to contract the band and wedge the other end of the band with said wedge between said coupling element and said pin so as to couple said wedge end of the band to said coupling element and to hold said pin against turning and unwinding the other end of the band.

4. A clamp comprising a coupling element, a pin mounted in said element, a band, means at one end of said band to fit between said coupling element and said pin, the latter being provided with means to secure the other end of the band thereto, the pin being adapted to be turned to wind one end of said band around it to contract the band and move the other end of the band with said first mentioned means between said element and said pin to hold the pin against turning and unwinding the band therefrom.

In testimony whereof, I have hereunto set my hand at San Francisco, California, this 21st day of September, 1915.

JOSEPH CURTIN.

In presence of—
ALAN FRANKLIN,
P. S. PIDWELL.

Copies of this patent may be obtained for five cents each, by addressing the "Commissioner of Patents, Washington, D. C."